INVENTOR.
H. FRAZER WELSH
William G. Miller Jr.
AGENT

Aug. 10, 1965 H. F. WELSH 3,200,384

DETENT SERVO SELECTOR

Filed June 18, 1958 5 Sheets-Sheet 2

*INVENTOR.*
H. FRAZER WELSH

William G. Miller Jr.

*AGENT*

Aug. 10, 1965 H. F. WELSH 3,200,384

DETENT SERVO SELECTOR

Filed June 18, 1958

5 Sheets-Sheet 3

INVENTOR.
H. FRAZER WELSH

William G. Miller Jr.
AGENT

Aug. 10, 1965
H. F. WELSH
3,200,384
DETENT SERVO SELECTOR
Filed June 18, 1958
5 Sheets-Sheet 4

*INVENTOR.*
H. FRAZER WELSH

William G. Miller Jr.
*AGENT*

Aug. 10, 1965 H. F. WELSH 3,200,384

DETENT SERVO SELECTOR

Filed June 18, 1958 5 Sheets-Sheet 5

INVENTOR.
H. FRAZER WELSH

William G. Miller Jr.
AGENT

United States Patent Office 3,200,384
Patented Aug. 10, 1965

3,200,384
DETENT SERVO SELECTOR
H. Frazer Welsh, Philadelphia, Pa., assignor to Sperry Rand Corporation, New York, N.Y., a corporation of Delaware
Filed June 18, 1958, Ser. No. 742,811
10 Claims. (Cl. 340—174.1)

This invention relates to information handling systems and particularly to information memory systems.

Among the information memory systems that have been developed are those employing a magnetic drum, in which a number of parallel recording tracks or channels are spaced along the axis of the drum and a corresponding number of magnetic recording heads are fixed adjacent such tracks for recording and reading from these tracks during rotation of the drum. Such magnetic drum storage systems have been well developed especially in digital computer and digital data processing systems. The fixed heads adjacent the drums require close mechanical tolerances to permit very close spacing of the parallel tracks. By means of electronic switching or gating systems, information may be recorded or read from desired ones of the tracks. Such an arrangement provides relatively fast access of desired portions of the drum.

Such an arrangement with fixed heads tends to become expensive when the size of such a magnetic drum is increased substantially. Under those circumstances, it becomes desirable to provide a single recording head or a small group of recording heads which may be moved along the axis of the magnetic drum adjacent selected one or ones of the tracks.

Accordingly it is among the objects of this invention to provide:

A new and improved memory system;

A new and improved memory system of the type employing a magnetic drum and a movable recording head;

A new and improved large drum memory having a high recording density, a large capacity, and a reasonably fast access to desired recording tracks; and A new and improved system for positioning a recording head along a recording drum.

In accordance with this invention, a movable recording medium and a movable recording head are provided, their respective movements being in transverse directions. Means are provided for moving the recording head to positions adjacent selected ones of the recording channels available on said medium. This moving means includes means for positioning the head adjacent one group of positions and adjacent interlaced positions of recording channels.

A feature of this invention is that the positioning means used to attain one group of positions is moved to attain the other group.

Another feature of this invention is the stepping of the recording head distances corresponding to the distance between adjacent group one positions and the stepping of the head distances corresponding to distances between adjacent interlaced and group one recording channel positions.

The foregoing and other objects, advantages and novel features of this invention as well as the invention itself, both as to its organization and mode of operation, may be best understood from the following description when read in connection with the accompanying drawing, in which like reference numerals refer to like parts, and in which.

Figure 1:
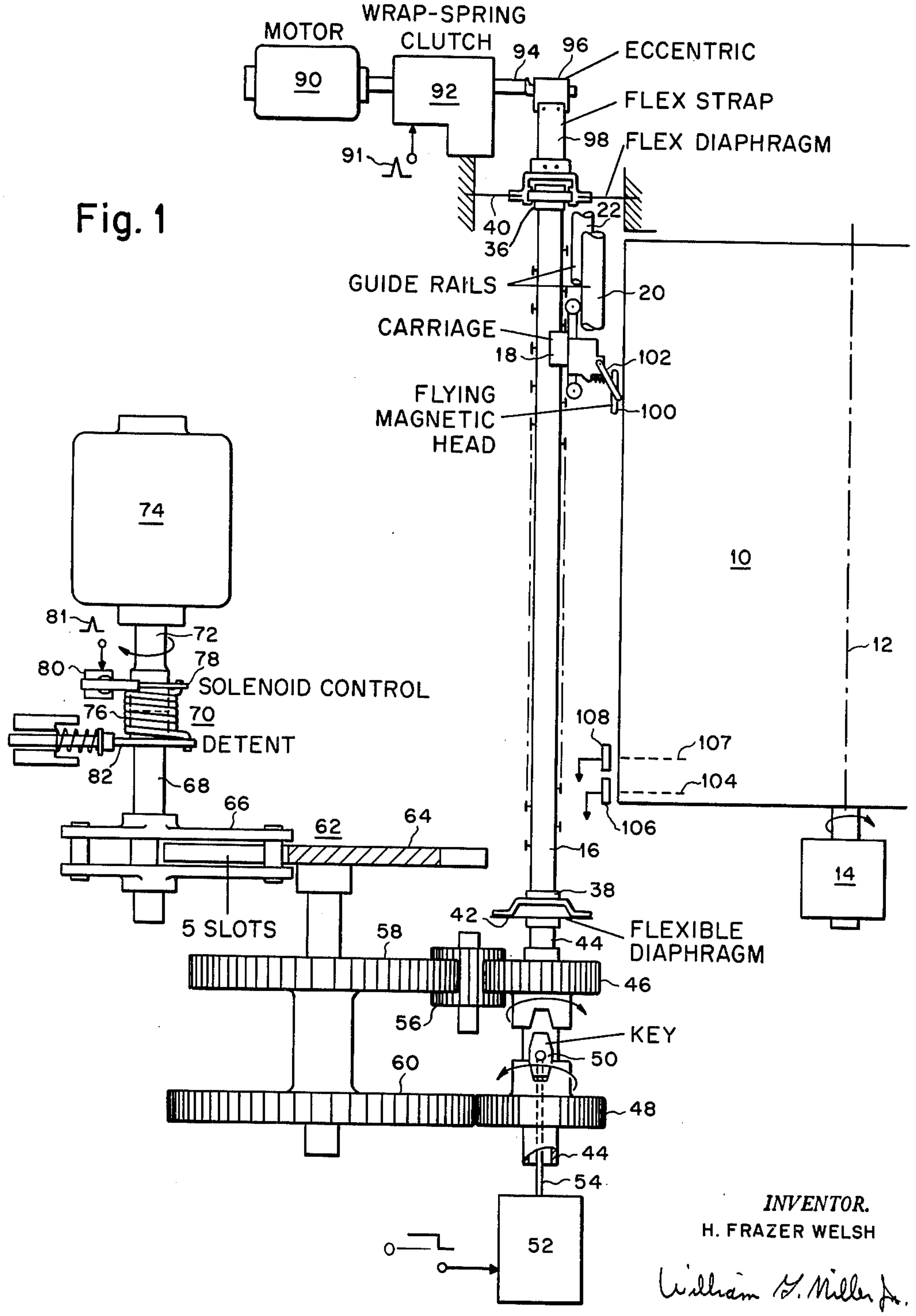
FIGURE 1 is a side view of a memory system embodying this invention.

In FIG. 1, a rotatable recording drum 10 is mounted for rotation about its axis 12 and is driven by a motor 14. Suitable bearing supports for the drum shafts are known in the art. Recording drums such as the drum 10 used for magnetic recording are made of nonmagnetic material with a carefully machined surface that is covered over its entire periphery with a magnetic substance on which magnetic recordings may be made. Mounted parallel to the drum 10 is a movable recording head 100 on a carriage 18 driven by a shaft 16. The shaft 16 may be threaded or provided with a helical gear to engage a mating thread on the carriage 18 and thereby act as a lead screw for the carriage. An alternative arrangement that has been used is shown in FIG. 2.

Figure 2:
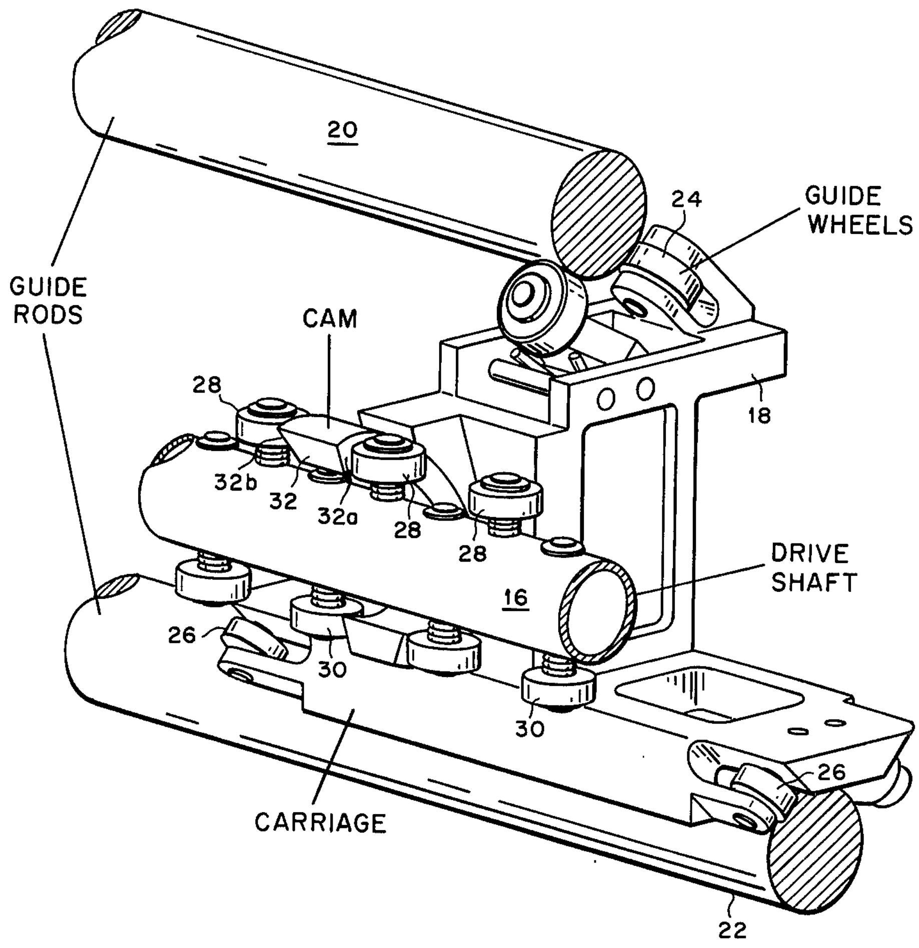
FIGURE 2 is a perspective view of a movable carriage arrangement that may be used in the sytem of FIG. 1.

In FIG. 2, the carriage 18 is arranged for movement along two guide rails 20 and 22. Guide wheels 24 on the upper portion of the carriage 18 engage the rail 20, and guide wheels 26 on the lower portion of the carriage 18 engage the guide rail 22. The guide wheels 24 may be spring tensioned to hold the carriage 18 in proper engagement with the rails 20 and 22.

Mounted along the top (as viewed in FIG. 2) of the drive shaft 16 are a plurality of uniformly spaced ball bearings 28. A similar plurality of ball bearings 30 are uniformly spaced along the bottom of the shaft 16; the bearings 30 being positioned midway between the bearings 28. The cam 32 has two parallel cam surfaces **32*a* and 32*b* on opposite sides, which have helical portions, and which are separated by a distance equal to the distance between adjacent ball bearing surfaces 28 or 30. A full pitch of the cam 32 will correspond to the distance between centers of adjacent bearings 28 or adjacent bearings 30 and a half-pitch will correspond to the distance between centers of adjacent bearings 28 and 30. The length of the cam 32 corresponds to somewhat more than a half-revolution of the shaft 16, and the helical portion extending somewhat less than a half-revolution. The cam 32, the ball bearings 28, 30, and the shaft 16 function in a manner similar to a lead screw to drive and position the carriage 18. Each time the shaft 16 rotates a half-revolution the next one of the ball bearings 28 or 30 engages the cam surface and moves the carriage 18 a distance half way between the centers of adjacent bearings 28 or 30. A cable may connect the carriage to a tension spring (not shown) which would preload the cam surface 32 against the bearings 28, 30**.

The ball bearing and cam arrangement insure accurate repositioning of the carriage 18 even if the angular position of the shaft 16 is slightly inaccurate. The reason for this is that the cam 32 is so designed that the ball bearings 28 and 30 engage the dwell area of the cam 32 when the carriage 18 stops. An initial portion of each of the cam surfaces **32*a* and 32*b*, shown in FIG. 2 as that area at the ends of the cam which the bearings 28 and 30 are in contact with, forms a dwell area. Thus, as long as the bearings 28 and 30** are in contact with this area, the position of the bearings is not critical in determining the position of the carriage 18, for the dwell areas form planes perpendicular to the axis of the shaft 16. Since only rolling action is involved, there is less wear than one would expect from a mechanism like a lead screw.

The bearings 36 and 38 (FIG. 1) respectively supporting the ends of the shaft 16 are in turn supported by flexible supports 40 and 42. The flexible support 40 may be a flexible diaphragm of flexible spider attached at its inner portion to the bearing 36 and attached at its outer portions to a standard or table support. The flexible diaphragm 42 is attached at its outer end to the bearing 38 and at central portion to a drive shaft 44 which is mounted in suitable bearings and on fixed supports (not shown).

Two gear wheels 46 and 48 are rotatably mounted on the shaft 44 and may be keyed to that shaft 44 by a suitable sliding key 50. Actuation of the key 50 may be in any appropriate manner, for example (as shown in FIG. 1) by means of a solenoid 52 having an actuator rod 54 extending through a hollow portion at the end of shaft 44 and attached to the sliding key 50. The gear wheel 46 is entrained through an idler 56 to another gear wheel 58. The gear wheel 48 is driven by a gear wheel 60. The gears 58 and 60 are driven by means of the driven element 64 of a Geneva mechanism 62. The driver 66 of the Geneva 62 in turn is driven by the output 68 of a clutch 70. The input shaft 72 of the clutch 70 is driven by a motor 74.

Any suitable clutch may be used for the clutch 70; by way of example, a wrap-spring clutch is shown. This type of clutch consists of a helical spring 76 which couples the input shaft 72 to the output shaft 68 when the spring 76 is wound up. Normally the spring 76 is held distended and disengaged by a stop 78 that engages a three-position detent (not shown) that is fixed to the input end of the spring 76. The stop 78 may be actuated by a solenoid 80. A spring detent 82 engages one out of three detent notches (not shown) around the shaft 68 and positively positions the output shaft 68 accurately when the clutch is disengaged. To engage the clutch 70, solenoid 80 is energized by a pulse 81. This serves to move the stop 78 to release the input end of the spring 76. This release action allows the spring 76 to contract and wind up to couple the two shafts 72 and 68. After a third of a revolution the detent at the input end of the spring engages the restored stop 78 to unwind the spring 76 and disengage the shafts 72 and 68. The next one of the detent notches (not shown) on the output shaft 68 is engaged by the detent 82 to position that shaft 68.

By way of example, a three-pin Geneva driver 66 is shown, the pins producing successive Geneva cycles with each third-revolution of the clutch 70. Thus, for each short impulse 81 applied to the solenoid 80, the clutch 70 is engaged to drive the Geneva driver 66 through a third-revolution, corresponding to a Geneva cycle.

By means of a five-slot Geneva output 64, and a gear ratio of 2 to 5 in the gear trains 58, 56, 46 and 60, 48, a Geneva cycle produces a half-revolution of the wheels 46 and 48. Depending upon the position of the key 50 in the downward or upward positions (as viewed in FIG. 1) respectively, there is a resulting half-pitch movement of the carriage 18 downward or upward.

In operation, the solenoid 52 is in its normal (say, unenergized) condition for movement of the carriage 18 in a downward direction; and is energized for engagement of the key 50 with the gear wheel 46 to drive the carriage in the upward direction. Successive impulses 81 applied to the solenoid 80, each produce a half-revolution of the shaft 16 in the direction determined by the condition of the solenoid 52 and each results in a predetermined precise movement of the carriage 18 corresponding to a half-pitch of the cam 32.

An additional mechanism at the upper portion of FIG. 1 is used to provide a movement of carriage 18 with respect to the drum 10 corresponding to the distance of a quarter-pitch of the drive of the shaft 16. A motor 90 drives the input of a clutch 92 which may be of the wrap-spring type similar to that described above with respect to the clutch 70. The clutch 92 may be of the two-position, or half-revolution, type. The output 94 of the clutch 92 drives an eccentric 96 which is connected by means of a flexible strap 98 to the flexible diaphragm 40 of the shaft 16.

The eccentric 96 has two positions: one producing a flexing of the diaphragms 40 and 42 upward and a corresponding movement of the shaft 16 to an upper position, and a second position producing a downward flexing of the diaphragms 40 and 42 and the corresponding lower position of shaft 16. The distance between those two positions of the shaft 16 is equal to the aforementioned quarter pitch of the shaft 16. The actuation of the eccentric 96 is in response to the two half positions of the clutch output 94. A first of successive pulses 91 applied to the clutch solenoid (not shown) causes the clutch output 94 (and the eccentric) to assume its first of two positions to move the shaft 16 to the corresponding upper position; and a second such pulse 91 causes the clutch output 94 to assume its second position to move the shaft 16 to the lower position. A third pulse 91 moves the shaft 16 to the upper position, and so on. The strap 98 yields to permit the eccentric to move between its upper and lower positions.

The magnetic recording head 100 may be mounted on gimbals 102 with suitable spring tension as described in the publication "A Large-Capacity Drum-File Memory System," by H. F. Welsh et al., Proc. of the Eastern Joint Computer Conference of December 1956 (1957).

The head 100 may have a single pair of pole pieces for reading and writing a single recording channel on the drum; or it may be made up of a plurality of parallel heads for reading or writing in a plurality of parallel circumferential channels simultaneously. Such a plurality of parallel channels is called a "band". Each of these channels may be divided into a plurality of sectors extending around the periphery of the drum. The beginning point of each sector or of each recording channel or group of channels may be determined by providing a timing track 104 of uniformly spaced timing or "sprocket" pulses around the periphery of the drum and by using a fixed recording head 106 to read these sprocket pulses. Suitable means, such as a counter (not shown) for registering the sprocket pulses read by the fixed head 106, to mark the rotary position of the drum at every instant are well known in the art. These sprocket pulses may be used in the usual manner to control the reading and writing operations. A second fixed head 108 may be used to read time-selection pulses in a channel 107. These time-selection pulses may be used to mark the first signal in each sector.

Figure 3:
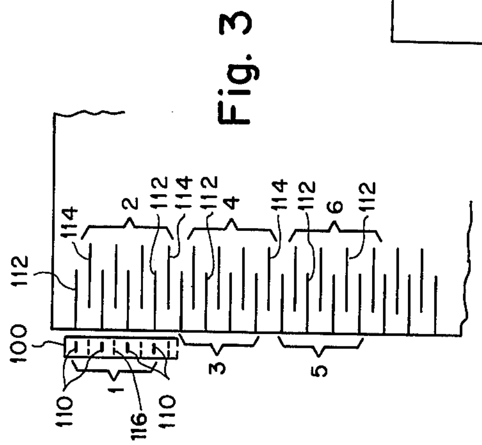
FIGURE 3 is graphical representation of an enlarged fragment of the surface of a recording drum in the system of FIG. 1 showing the relationship of interlaced recording tracks and bands thereon.

In FIG. 3, there is represented schematically an interlaced arrangement of recording channels on the drum 10. By way of illustration, the recording head 100 is shown as having four separate heads 110 that are spaced for reading adjacent four channels 112 forming a band. Interlaced with the channels 112 are other recording channels 114, which are the same as the channels 112 but which are related to the selection system for moving the head 100 in a somewhat different way. The lines 112 and 114 represent the relative location of the recording channels. The first band of channels 112 is enclosed in a bracket and referenced by the numeral 1, the next band of channels 112 is enclosed by a bracket and referenced by the numeral 3; and the third band of channels 112 is referenced by the numeral 5. The first interlaced band of channels is enclosed by a bracket and represented by numeral 2, the next band by the numeral 4, and the third such band by numeral 6. Each odd-numbered band and its succeeding even-numbered band may be considered as a pair.

In operation, consider an initial condition of the diaphragms 40, 42 being flexed to the upper position. Successive pulses applied to the solenoid 80 of the clutch 70, as described above, produce half-revolutions of the shaft 16 (and half-pitch translations thereof) to drive the carriage 18 and the head 100 to the successive bands 1, 3, and 5 shown in FIG. 3 starting with the head 100 at the band 1 (as shown in full lines in FIG. 3). A pulse 91 applied to the clutch 92 causes the diaphragms 40 and 42 to be moved to their lower position, which results in a quarter-pitch movement of the shaft 16 and the head 100 to the position of interlaced channels 114 in band 2. This position of the multi-channel head 100 is shown in dotted lines and referenced by the numeral 116. When the diaphragms 40, 42 are flexed to their lower position, so that the shaft 16 is similarly positioned, successive pulses 81 applied to the solenoid 80 of the clutch 70 causes the head 100 to be moved half-pitch increments from the band 2 position successively to the band 4 and the band 6 positions. Thus, each pulse 81 applied to the solenoid 80 produces a stepping movement of the multi-channel head corresponding to the distance between the successive bands of the channels 112 or between successive bands of the channels 114 depending upon whether the shaft 16 is in the upper or lower position. Jogging takes place between adjacent bands forming a pair, e.g., between bands 1 and 2, between bands 3 and 4, and so on.

For purposes of many applications it is desirable to move the multi-channel head through a certain order of bands successively with a minimum of time between each movement. For example, the head 100 may be moved to a first band, the operation of reading or writing (as the case may be) performed, and the head 100 then moved to the next band in order, and so on. One system whereby such movement of the head in a certain order may be simply performed is by successive alternate operations of the Geneva stepping mechanism 62 and the diaphragm reciprocating mechanism 96. For purposes of description, the Geneva stepping operation is termed a "step," and the stepping produced by diaphragm movement is termed a "jog."

Thus, initially the head 100 is in the band 1 position, the diaphragms 40 and 42 are flexed upward as viewed in FIG. 1, and solenoid 52 is unenergized to engage the key 50 with the gear 48. A first signal is a jog pulse 91 to produce a jog downward, (as viewed in FIG 3) moving the head 100 to the band 2 position. The second signal is a step pulse 81 producing a step down and moving the head to the band 4 position; the third signal is a jog pulse 91 producing a jog up moving the head 100 to the band 3 position; the fourth signal is a step pulse 81 producing a step down moving the head 100 to the band 5 position. These four pulses 91, 81, 91, 81 complete a cycle.

A new cycle is started by the next jog pulse 91 in the same alternating order to move the head 100 down to the band 6 position. These cycles may be repeated successively until the head 100 is moved to the other end of the drum 10. At that point the reversing solenoid 52 may be energized to actuate the key into engagement with gear 46. Thereby, successive stepping pulses 81 result in steps upward, and these steps may alternate with jogs in a similar manner. The band order with upward stepping may be the same or different as desired.

Figure 4:
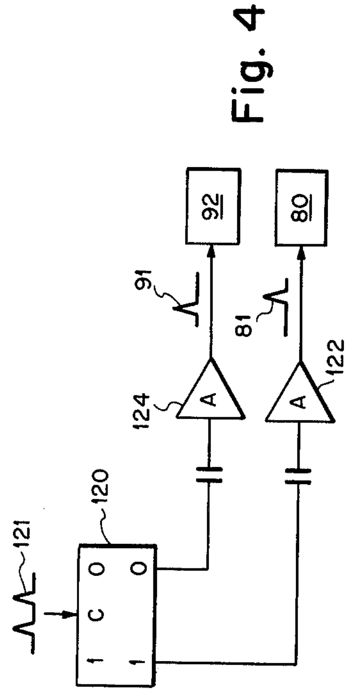
FIGURE 4 is a schematic block diagram of a circuit for controlling a certain sequence of operation.

One arrangement whereby the stepping operation shown in FIG. 3 may be carried out is shown in FIG. 4. In FIG. 4, a bistable flip-flop 120 receives triggering, or complementing, impulses at a C input, these triggering impulses reverse the state of the flip-flop. Opposite outputs of the flip-flop are capacitor-coupled to the amplifiers 122 and 124 respectively, which in turn, drive the solenoid 80 and the solenoid of clutch 92 respectively. The pulses 121 may be supplied by a computer or other data processing system, and the first such pulse 121 drives the flip-flop 120 to produce an output signal, say positive going, from the 0 output which energizes the amplifier 124 to supply a jog pulse 91 to the solenoid of the clutch 92. A negative-going output from the 1 output of the flip-flop 120 at that time does not affect the amplifier 122. The next such input pulse 121 reverses the state of the flip-flop 120 to supply a positive-going pulse to the amplifier 122 which in turn energizes the solenoid 80 with a step pulse 81. Thus, successive actuation pulses 121 alternately actuate the clutches 92 and 70 to move the recording head 100 alternately with a jog and a step. By this means, the aforementioned order of head movement may be carried out.

Another order of head shifting that may be convenient is that one in which the head is stepped successively through alternate bands from one end of the drum to the other. At the other end, the head is jogged one jog, the stepping direction reversed, and the head returned by way of the other alternate positions. This scheme may be advantageous for some purposes.

Due to the "interlaced" arrangement of channels 112 and 114 and due to the different head-positioning movements of a step and a jog, the recording heads 110 may be spaced apart the distance between adjacent channels 112 and between adjacent channels 114. However, effectively the spacing between recording channels is the smaller distance between adjacent channels 112 and 114. Thus, the recording density on the drum may be greater than that afforded by recording-head spacing. Due to the expensive character of recording head mountings that meet close spacing tolerances, there is an improved relationship between recording-head cost and recording density. In addition to the relative improvement in recording-head tolerances, there is an improvement in mechanical tolerances for the head positioning system. Thus, the half-pitch of a lead screw drive such as that of shaft 16 may be that of the spacing between adjacent channels 112, and the quarter-pitch movement between adjacent channels 112 and 114 may be separately furnished by mechanically simpler means.

With respect to speed of positioning of the head 100, the jog reciprocating movement may be substantially faster than the step movement. An additional time saving may be afforded during an operation in which the order of head selection involves more than a single step or jog between each selection. Under such circumstances, with a drum having, say, 100 bands, it is readily appreciated that only 50 steps are needed to traverse the length of the drum which is a substantial gain over a system that does not have a jog available for intermediate "interlaced" band positions.

Figure 6:
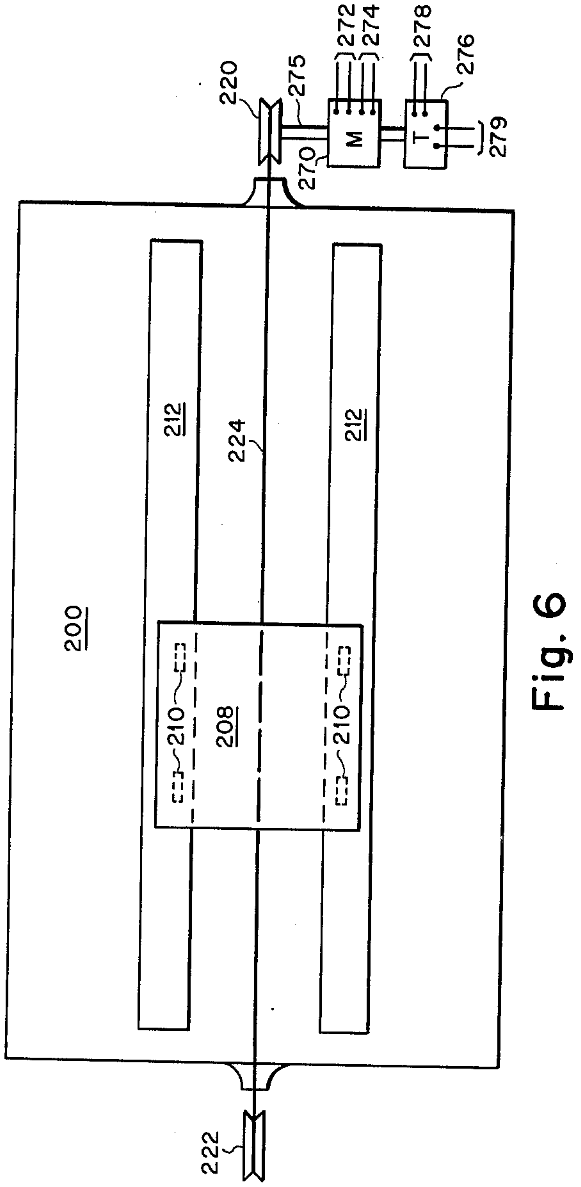
FIGURE 6 is a top view of the system shown in FIG. 5.
Figure 5:
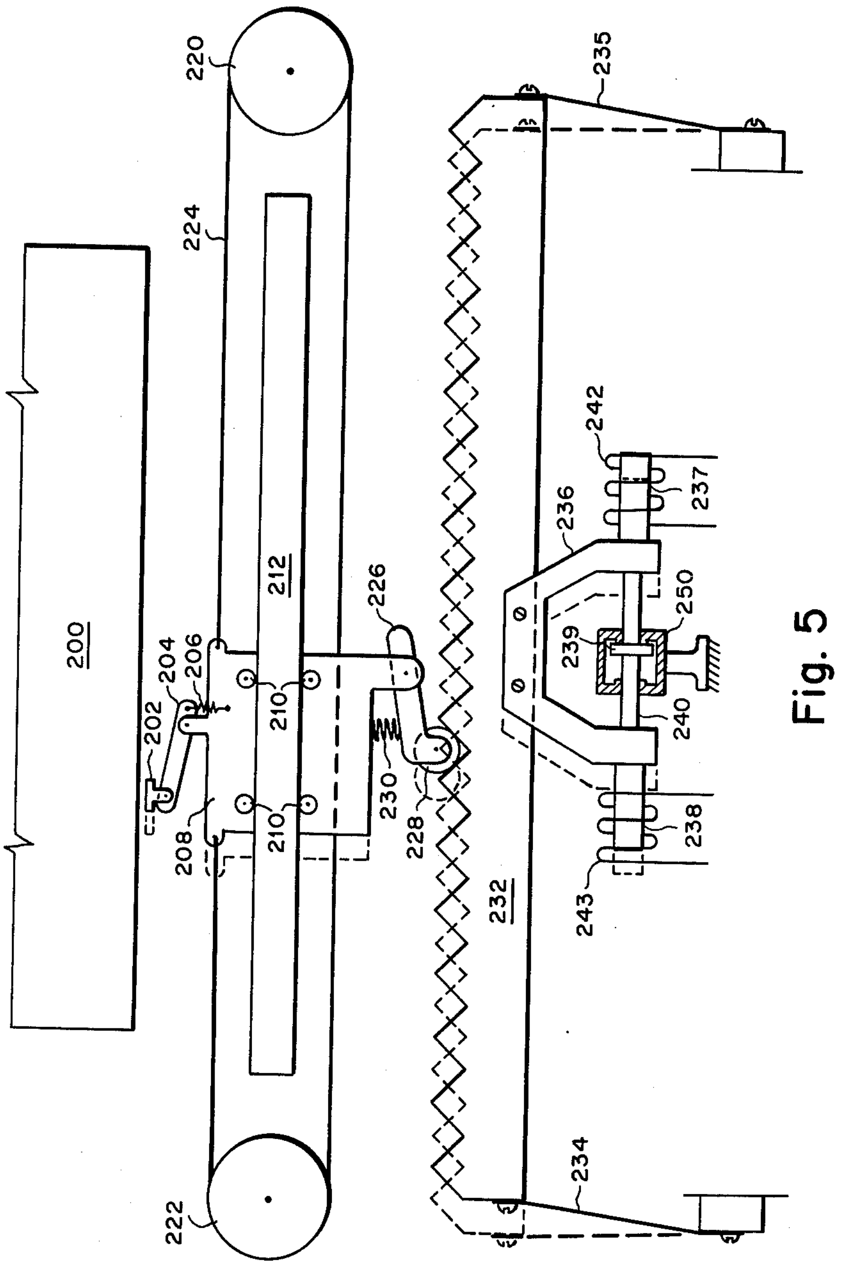
FIGURE 5 is a side view of another memory selecting system and selector apparatus therefor embodying this invention.

Another embodiment of this invention is shown in FIGS. 5 and 6 in which FIG. 5 is a side view and the top view is shown in FIG. 6.

Referring to FIG. 5, the magnetic drum 200 is shown in a broken away section. The drum 200 is generally similar to drum 10 of FIG. 1, and the band arrangement on drum 200 is similar to that described above with respect to FIG. 3. It has in juxtaposition with its surface a magnetic recording head member 202 which may be supported as shown by lever 204 and a spring 206 biasing the head member towards the drum. The head member 202 may be of the type utilizing the principle of the Kingsbury thrust bearing as a means for maintaining the desired spacing between the head member and the drum surface as described in the above-cited article by Welsh et al. This spacing may be maintained by other means well known in the art, such as by a means of a stream of air supplied from a source of compressed air.

The lever 204 is pivotally mounted on a movable carriage 208. The movable carriage 208, in turn, is supported by means of bearing members 210, such as wheels, which are positioned on opposite sides of guide rails 212. As shown in FIG. 5 these bearing members may be so placed that there are two on each side of each of the rails 212 to support the carriage for free movement. This movement is along an axis parallel to the axis of the drum 200 in order that the head member 202 may be placed in registration with any of a number of regularly spaced circumferential information bands on the drum. The carriage 208 is connected to a first positioning means comprised of pulleys 220 and 222. The pulleys 220, 222 carry a cord 224 which is, in turn, connected to the carriage 208 as shown in FIG. 5 in order that rotation of the pulley 220 produces the desired movement or translation of the carriage.

The carriage 208 also has mounted on it a detent mechanism consisting of a lever 226 which is pivotally mounted to the carriage and which carries at one end a detent roller 228. The lever is biased by compression spring 230 to tend to maintain the roller 228 between pairs of teeth in a rack 232.

The rack 232 is attached at its ends to leaf springs 234 and 235 which are firmly mounted at ends opposite those fixed to the rack so that the normal relaxed position corresponds with the vertical position (not shown).

The rack 232 has attached to it a yoke 236 which carries solenoid slugs 237 and 238 as well as a dashpot piston 239 which is firmly attached to the yoke 236 by means of rod 240. Each of the slugs 237 and 238 are of magnetizable material and form cores in their respective solenoids 242 and 243. The piston 239 is moved by yoke 236 in the fixed dashpot cylinder 250 which may contain a viscous fluid, such as oil, and be completely closed at its ends to form a bi-directional dashpot. The dashpot restriction is established by the gap between the piston and the cylinder walls.

The rack 232 is "jogged" to the right by energization of the solenoid 242 and de-energization of the solenoid 243. This rack position is shown by the solid lines. In this right-hand position, the carriage 208 and associated detent mechanism have the positions represented by the solid lines, and the head 202 is in registration with the interlaced channels 114 of the even-numbered bands (see FIG. 3) on drum 200.

The odd-numbered one of each pair of circumferential bands is in registration wtih the head 100 when the solenoid 243 is energized and solenoid 242 is de-energized. This left-hand position of the rack is shown by dashed lines as is the corresponding carriage position and head position. The proportions in FIG. 5 are modified to facilitate illustration.

The pulley 220 is rotated by a motor 270 (FIG. 6). The motor 270 may be a two-phase motor provided with an A.C. supply of fixed phase at the connections 272. The motor is also selectively energized from the connecting wires 274 by an alternating current 90 degrees out of phase with that supplied at connection 272, as is explained further hereinafter. The motor 270 is connected by a shaft 275 to the pulley 220 and to an A.C. tachometer 276 which is energized by the field connections 279 and which provides an A.C. output at its connections 278.

One of the possible modes of operation to which the above described embodiment lends itself is routine scanning of the recorded bands on the drum 200 with the head member 202. This scanning operation may comprise the following series of steps:

(1) Read the band at the extreme left-hand end of the drum, which would be band 1 in FIG. 3 or in other words the first band of the first pair.

(2) A jog to the right by actuation of solenoid 242 to provide registration between the head member 202 and the band 2 which is the second band of the first pair.

(3) Step right by energization of motor 270 to band 4.

(4) Jog left to band 3.

(5) Step right to band 5.

(6) Jog right to band 6 and so on.

This scanning process consists of alternating "steps" and "jogs" where the "step" is provided by movement of the carriage by the motor 270 from one detent position on the rack 232 to a neighboring detent position, and the jog consists of movement of the carriage 208 by energizing either solenoid 242 or 243 (de-energizing the other) to move the rack 232 to the right or left respectively. The piston 239 may be positioned against the right hand end of cylinder 250 or the left hand end, the ends of the cylinder acting as limit stops to determine the amount of movement of the carriage rack 232 (and thereby of the carriage 208) which is produced by a "jog."

Figure 7:
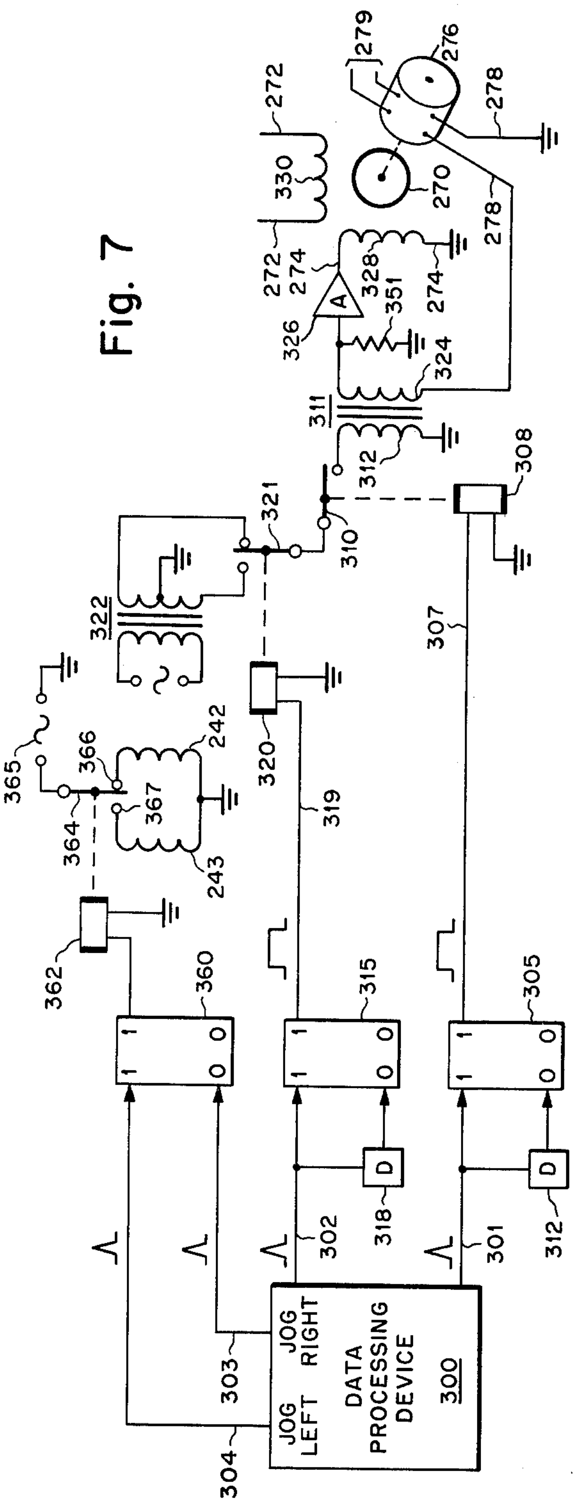
FIGURE 7 is a schematic circuit diagram of an example of control circuitry that may be used for operating the memory system of FIG. 5.

Control circuits for accomplishing the above described "steps" and "jogs" in accordance with signals from a data processing device are shown in FIG. 7. In FIG. 7, the data processing device 300 selectively provides control signals on four lines, 301–304. Line 301 is selectively energized by a pulse when a step is required. The pulse supplied to line 302 sets up circuits so that any step called for by energization of line 301 is made in the left-hand direction. In the absence of a pulse on line 302, a step is in the right-hand direction. The pulse supplied to line 301 occurs shortly after any pulse supplied to line 302. A pulse is supplied to line 304 to produce "jog left," and a pulse is supplied to line 303 to produce "jog right."

The circuitry for controlling a step operation and the direction of the step includes flip-flops 305 and 315. A step pulse supplied to line 301 drives flip-flop 305 to the "1" state. The resulting rise at the 1 output of flip-flop 305 is supplied via line 307 to energize relay coil 308. As a result, the relay switch 310 moves from the normal open position to complete a circuit to transformer primary 312. The pulse appearing on line 301 also passes via a delay element 312. After the period of delay element 312, flip-flop 305 is reset to the "0" state. This reset terminates the pulse on line 307, and relay coil 308 is deenergized and switch 310 is opened. There is thus accomplished a predetermined period of energization of primary coil 312 initiated by a pulse on line 301.

The phase in which the primary winding 312 is energized independent upon the existence of a pulse or the absence of a pulse on line 302 just preceeding the pulse on line 301. The flip-flop 315 has an associated delay 318, which is similar to delay 312. The relay coil 320 is in the deenergized condition, as shown, in the absence of a pulse on line 302; or in the energized condition, in response to the presence of a pulse on line 302. As previously explained, the combination of flip-flop 315 and the delay 318 produces a pulse on line 319 in response to the existence of a pulse on line 302. In operation, when relay coil 308 is energized to complete the circuit of transformer primary 312, the transformer 322 supplies alternating current (A.C.) of either of opposite phases via one or the other parts of its center tapped secondary dependent upon whether or not the relay coil 320 is energized.

The energization of primary winding 312 in one phase as by the normal connection of relay contact 321, as shown in FIG. 7, causes the secondary coil 324 to be energized in the phase which results in a right hand step by the motor 270. As shown in FIG. 7, the ouput of the secondary 324 is enhanced by amplifier 326 to provide the desired energization of field coil 328 of motor 270. The field coil 330 of the motor 270 is energized by a fixed phase of alternating current.

Thus, upon energization of relay coil 308, the motor windings 328 and 330 are energized and the motor 270 rotates. The A.C. tachometer 276 also rotates to generate at connections 278 a potential proportional to the speed of rotation. The connections 278 are placed in series with the secondary winding 324 of the transformer 311 so that the potential induced in secondary 324 as a result of energization of primary 312 is added to the potential generated at connections 278. The sum of these potentials appears across resistor 351 as the input to amplifier 326. The potential generated at connections 278 is 180 degrees out of phase with the potential in the secondary winding 312 to produce a negative feedback from the tachometer 276. The tachometer 276 may have its field coil energized by A.C. of suitable phase to produce this negative feedback or, alternatively, the connections 278 and winding 324 may be connected to effect the negative feedback.

In operation, the motor 270 is driven during the period in which relay coil 308 is energized, with negative feedback from the tachometer 276 tending to stabilize the speed of the motor at some fixed value. De-energization of the coil 308 may generally be arranged to occur at a time prior to the bottoming of detent roller 228 (FIG. 5) between the pair of teeth in the rack 232 to which the carriage is being stepped. Upon this deenergization of the coil 308 the motor 270 continues to rotate due to inertia and due to the spring 230 on detent roller 228 tending to cause the roller 228 to "bottom."

This motor rotation causes a continuing energization of tachometer connections 278 to energize the motor in a direction that tends to oppose the motion of detent 228 to the bottom position. By this means, there is provided a damping which prevents overshoot and oscillation of the detent roller 228.

The means for jogging the carriage, as explained above, is provided by the solenoid coils 242 and 243 (FIGS. 5 and 7). To produce "jog left," the data processing device 300 produces an impulse on line 304 to drive a flip-flop 360 to the "1" state and causes the energization of relay coil 362. This actuates relay contact 364 from its normal engagement with the upper contact 366 (and the resulting energization of solenoid 242) to engagement with the lower contact 367 to energize solenoid 243 from A.C. source 365. As a result, the rack 232 is moved in a lefthand direction to effect registration of head member 202 with the odd-numbered band of one of the pairs of circumferential bands on drum 200.

On the other hand, to produce "jog right" the data processing unit provides a pulse on line 303. The flip-flop 360 is driven to the "0" state with a consequent de-energization of relay coil 362. When relay coil 362 is de-energized, contact 364 completes a circuit from the A.C. supply 365 to solenoid coil 242. Thus "jog right" is effected, which brings head member 202 in registration with the even-numbered band of the pair.

During the occurrence of a "jog," the detent roller 228 tends to ride up one side of a rack tooth. This may result in oscillations of the roller 228 and of the carriage 208 with it. These oscillations are effectively damped.

Movement of carriage 208 with the rack 232 causes rotation of the tachometer 276 through pulley 220, and produces a potential at connections 278 which in turn energizes the motor 270 for rotation in a direction opposite its existing direction of rotation. The motor torque thus opposes movement of the carriage 208. This motor torque provides a damping which reduces the possibility of oscillation of the detent roller (and, thereby, of the carriage 208) during a "jog."

The systems described above with respect to FIGS. 1 and 5 allow for two stable jog positions of the shaft 16 and rack 232, respectively. That is, there is a jog position between adjacent step positions. This invention also may be used to provide more than one jog position between step positions. For example, in the system of FIG. 1, the eccentric 96 may be used to provide more than two uniformly spaced translatory positions of the shaft 16, such as by providing the clutch 92 with more than two detent positions.

Figure 8:
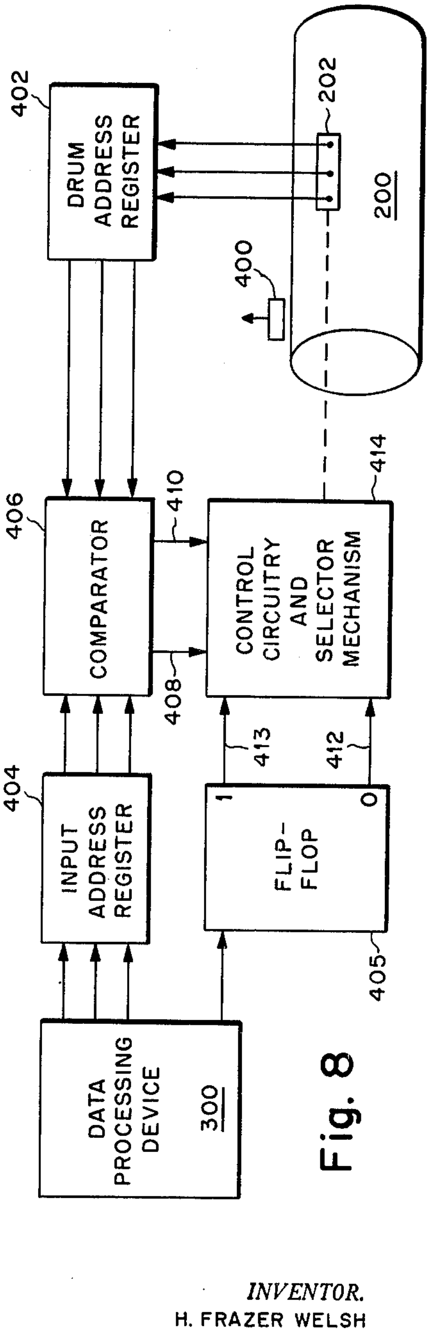
FIGURE 8 is a schematic block diagram of a control for the system of FIG. 5 to provide random-access positioning of the recording head.

The system of FIGURES 5–7 may also be used to provide random-access selection of a particular band on the drum 200. A block diagram of a control system for such selection is shown in FIGURE 8. In such a system, each band is referenced by a particular address. These addresses are stored at the beginning of each sector of the associated bands. When a head is stepped to a particular band, it reads the address of that band, for example, as the first group of signals in the sector. This reading may be timed under the control of a fixed head 400 and track, which may be similar to the head 108 and the track 107 described above with respect to FIGURE 1. Electrical circuitry for reading these signals is known in the art.

These address signals, when read by the multi-channel head 202, are transmitted to a drum address register 402. If we assume that the address is represented by a 4-bit binary number, the three most significant digits are stored in the register 402. The least significant digit represents the "jog" condition of the rack 232. This condition is "stored" in the flip-flop 360 (FIG. 7). An input address register 404 receives address signals from a data processing device 300, which signals represent the three most significant digits of the location address to which the head 202 is to be moved. A flip-flop 405, which may be part of the register 404, receives the least significant address digit. A comparator 406, which may be a subtractor, receives the signals stored in the registers 402 and 404. The signals received from the registers 402–404 are in digital form such as, in a binary code. The comparator 406 subtracts the address of register 402 from the address of register 404 and produces signals on output lines 408 and 410, in accordance with the sign of the difference. These outputs 408, 410 are connected to control circuitry 414 which may be, for example, the circuitry described above with respect to FIGURE 7. For example, the output lines 408 and 410 from the comparator 406 and the outputs 412 and 413 from the flip-flop 405 may be respectively connected to the input lines 301-304 of the circuit of FIG. 7.

If the difference between the address in the registers 402 and 404 is zero, the head is located at the correct address, and no pulse appears on either of the output lines 408 or 410. If the difference between the addresses is other than zero a pulse appears on the line 408 indicating that a step is needed. The sign of the difference determines the direction of the step. If the step that is needed is to the right, there is no pulse produced on the output line 410; if the step needed is to the left, a pulse is produced on the line 410.

The least significant binary digit in the flip-flop 405 represents the "jog" input address; i.e. this digit represents whether the rack 232 should be in the odd-numbered or even-numbered band position. The outputs of flip-flop 405 drive the flip-flop 360 (FIG. 7) to the required condition to produce the proper energization of solenoid 242 or 243. For a step operation, the remainder of the input address is compared with the address set up in the drum register 402. Assuming the difference is other than zero, a pulse is supplied to the line 408. Also, assuming that the sign of the difference is positive corresponding to a step-right being needed, there is no pulse on the line 410. As a result, a pulse appears on the line 301, but not on the line 302 (FIGURE 7), which causes a step operation to take place moving the carriage one step to the right. The head 202 reads the address in the new band location changing the address in the drum register 402. The comparison operation is repeated and the head 202 is stepped as required until the address in the drum register 402 is the same as in the input register 404. If the difference between the addresses is negative, pulses are supplied via lines 408 and 410 to lines 301 and 302 to produce a step left. The step left operations are likewise repeated until the difference is zero.

The system of FIGS. 5–7 affords improvement in tolerances needed for the mechanical selection system and in the recording head, and improvement in the operating speed similar to the improvement in the system of FIG. 1 discussed above. In the systems of FIGS. 1 and 4 the "jog" operation may take place simultaneously with the "step" operation to afford further increase of selection speed.

In accordance with this invention a new and improved memory system is provided. With this system, high recording density, large capacity, and reasonable fast access may be provided.

What is claimed is:

1. A positioning apparatus adapted to accurately position a magnetic transducer head adjacent a preselected track of a magnetizable record medium, the positioning being accomplished in two steps, a rough positioning step and a fine positioning step, said positioning apparatus comprising: movable support means for supporting said transducer head for movement relative to said record medium over a plurality of record tracks thereon, a motor operatively connected to said support means for moving said support means over a plurality of record tracks, signal translating means for energizing the motor in accordance with an incoming signal to select a track of said record medium in accordance with said signal, thereby causing the motor to move said support means to the neighborhood of said selected track and accomplish the rough adjustment, and detent means cooperating with said support means and operative independently of said motor in accordance to said incoming signal to superimpose an additional movement upon said support means after the transducer head has been positioned in the vicinity of the pre-selected track by said motor to thereby accurately position the head in alignment with said pre-selected track and accomplish the fine adjustment.

2. A positioning apparatus for accurately positioning at least one magnetic transducer head adjacent a pre-selected track of a plurality of tracks on a magnetizable record medium in response to a command signal, said positioning apparatus comprising: a movable support carrying said transducer head for movement over the range of tracks on said magnetizable record medium, a motor operatively connected to said movable support, signal translating means for translating an incoming command signal and energizing the motor in accordance therewith to cause said motor to move said support means to the vicinity of a selected track of said record medium in accordance with said incoming command signal, and a means cooperating with said movable support for superimposing a fine adjustment independently of said motor upon said support in accordance with said command signal.

3. A device as defined in claim 2 wherein said movable support includes an axially movable bar, and a lost motion connection is provided between the motor and the axially movable bar.

4. A memory system comprising
(a) a movable recording medium having positions corresponding to first and second pluralities of recording channels spaced alternately therealong in a direction transverse to the direction of movement of said medium;
(b) a recording head movable in said transverse direction; and
(c) means for selectively moving said head to a position adjacent a selected one of said recording channel positions, said selectively moving means including
(1) means for establishing positions for said head adjacent each of said first recording channel positions,
(2) first moving means for moving said head to a selected one of first recording channel positions, and
(3) second moving means, independently operable with respect to said first moving means, for moving said position establishing means in said transverse direction to move said head adjacent a position corresponding to one of said second recording channels.

5. A memory system comprising
(a) a movable recording medium having positions corresponding to first and second pluralities of recording channels spaced alternately therealong in a direction transverse to the direction of movement of said medium;
(b) a recording head movable in said transverse direction; and
(c) means for selectively moving said head to a position adjacent a selected one of said recording channel positions, said selectively moving means including
(1) first means for stepping said head to positions adjacent successive ones of said first recording channel positions, and
(2) second means for stepping said head to positions adjacent successive ones of said second recording channel positions.

6. A memory system comprising
(a) a movable recording medium having positions corresponding to first and second pluralities of recording channels spaced alternately therealong in a direction transverse to the direction of movement of said medium;
(b) a recording head movable in said transverse direction; and
(c) means for moving said head to a certain order of positions adjacent said recording channel positions, said moving means including
(1) first means for stepping said head a plurality of discrete distances, each discrete distance corresponding to that between successive ones of said first recording channel positions, and
(2) second means for stepping said head a discrete distance corresponding to that between adjacent ones of said first and said second recording channel positions.

7. A memory system comprising
(a) a movable recording medium having positions corresponding to the first and second pluralities of recording channels spaced alternately therealong in a direction transverse to the direction of movement of said medium;
(b) a recording head movable in said transverse direction; and
(c) means for selectively moving said head to a position adjacent a selected one of said recording channel positions, said selectively moving means including
(1) means ordinarily operable to step said head through a plurality of discrete distances to successively position said head adjacent different ones of said first recording channel positions, and
(2) means operable in conjunction with said stepping means to move said head an additional discrete distance corresponding to that between adjacent ones of said first and said second recording channel positions so that said stepping means is operable to successively position said head adjacent different ones of said second recording channel positions.

8. A memory system comprising
(a) a movable recording medium having a first and second plurality of recording channels spaced alternately thereon;
(b) a movable recording head;
(c) first means for establishing a plurality of discrete first positions for said head each opposite a different one of said first plurality of channels;
(d) second means for selectively moving said head to one of said first positions; and
(e) third means selectively operable in conjunction with said first means to establish a plurality of second positions for said head each opposite a different one of said second plurality of channels.

9. A memory system comprising
(a) a rotatable drum having a first and second plurality of regularly spaced recording channels on its surface, said first and second plurality of channels being interlaced;
(b) a recording head member;
(c) first means supporting said head member for movement transverse to said recording channels; and
(d) second means for determining a plurality of discrete positions for said head member along a line transverse to said recording channels, said discrete positions being opposite said first plurality of recording channels, said second means including
  (1) a rack having a plurality of evenly spaced teeth;
  (2) a spring biased pawl mechanism attached to said first means and operable in cooperation with said rack to establish said discrete positions, and
  (3) means selectively operable to move said rack in a direction transverse to said recording channels whereby said rack in cooperation with said pawl mechanism defines discrete positions for said head member opposite channels of said second plurality.

10. A memory system comprising
(a) a rotatable drum having first and second plurality of regularly spaced recording channels on its surface, said first and second plurality of channels being interlaced;
(b) a recording head member carrying a plurality of recording heads, said recording heads being spaced along said head member so that the heads of said head member are in recording relationship to adjacent ones of either said first or second plurality of channels;
(c) first means supporting said head member for movement transverse to said recording channels; and
(d) second means for determining a plurality of discrete positions for said head member along a line transverse to said recording channels, said discrete positions being opposite said first plurality of recording channels, said second means including
  (1) a rack having a plurality of evenly spaced teeth;
  (2) a spring biased pawl mechanism attached to said first means and operable in cooperation with said rack to establish said discrete positions, and
  (3) means selectively operable to move said rack in a direction transverse to said recording channels whereby said rack in cooperation with said pawl mechanism defines discrete positions for said head member opposite channels of said second plurality.

References Cited by the Examiner

UNITED STATES PATENTS

| | | | |
|---|---|---|---|
| 2,674,728 | 4/54 | Potter | 340—174.1 |
| 2,832,841 | 4/58 | Eldridge | 340—174.1 |
| 2,852,762 | 9/58 | MacDonald | 340—174 |

OTHER REFERENCES

Proceedings of the Eastern Joint Computer Conference, pages 136–138, Dec. 10–12, 1956, "A Large-Capacity Drum-File Memory System," by H. F. Welsh and V. J. Porter.

IRVING L. SRAGOW, *Primary Examiner.*

ELI J. SAX, *Examiner.*

UNITED STATES PATENT OFFICE
CERTIFICATE OF CORRECTION

Patent No. 3,200,384 August 10, 1965

H. Frazer Welsh

It is hereby certified that error appears in the above numbered patent requiring correction and that the said Letters Patent should read as corrected below.

Column 8, line 38, for "independent" read -- is dependent --.

Signed and sealed this 5th day of April 1966.

(SEAL)
Attest:

ERNEST W. SWIDER
Attesting Officer

EDWARD J. BRENNER
Commissioner of Patents